United States Patent [19]

Caprio et al.

[11] E Patent Number: Re. 33,705

[45] Reissued Date of Patent: Oct. 1, 1991

[54] INTERCHANGEABLE INTERFACE CIRCUIT STRUCTURE

[75] Inventors: A. Ronald Caprio, Burlington; John P. Cyr, Littleton; Bernard O. Geaghan, Boylston; Paul C. Kotschenreuther, Berlin; David J. Schanin, Sudbury; Ronald M. Salett, Framingham, all of Mass.

[73] Assignee: Digital Equipment Corporation, Maynard, Mass.

[21] Appl. No.: 191,221

[22] Filed: May 6, 1988

Related U.S. Patent Documents

Reissue of:

[64] Patent No.: 4,670,855
Issued: Jun. 2, 1987
Appl. No.: 788,944
Filed: Oct. 18, 1985

U.S. Applications:

[63] Continuation of Ser. No. 351,721, Feb. 24, 1982, abandoned.

[51] Int. Cl.[5] ..... G06F 3/00

[52] U.S. Cl. ..... 364/900; 364/937.01; 364/940; 364/940.2

[58] Field of Search ... 364/200 MS File, 900 MS File; 340/825.07, 825.54

[56] References Cited

U.S. PATENT DOCUMENTS

| | | | |
|---|---|---|---|
| 3,710,324 | 1/1973 | Cohen et al. . | |
| 3,796,992 | 3/1974 | Nakamura et al. . | |
| 3,800,287 | 3/1974 | Albright . | |
| 3,815,099 | 6/1974 | Cohen et al. . | |
| 3,909,790 | 9/1975 | Shapiro et al. . | |
| 3,983,540 | 9/1976 | Keller . | |
| 3,997,879 | 12/1976 | Markley et al. | 364/900 |
| 4,023,143 | 5/1977 | Braunstein . | |
| 4,025,906 | 5/1977 | Rii Konen | 364/200 |
| 4,155,115 | 5/1979 | Wilske | 364/900 X |
| 4,171,541 | 10/1979 | Houpt | 364/900 |
| 4,236,207 | 11/1980 | Rado et al. . | |
| 4,293,928 | 10/1981 | Baun | 364/900 |
| 4,303,993 | 12/1981 | Panepinto, Jr. et al. | 364/200 X |
| 4,313,196 | 1/1982 | Oblonsky . | |
| 4,326,250 | 4/1982 | McCullough . | |
| 4,373,183 | 2/1983 | Means et al. | 364/200 |
| 4,417,302 | 11/1983 | Chimienti et al. . | |
| 4,430,584 | 2/1984 | Someshwar et al. | 364/900 X |
| 4,447,881 | 5/1984 | Brantingham et al. | 364/490 X |

FOREIGN PATENT DOCUMENTS 0041406 6/1981 European Pat. Off. .

OTHER PUBLICATIONS

Edgar, "Bus Arbitration Logic," IBM Technical Disclosure Bulletin, vol. 23, No. 4. (Sep. 1980).

*Primary Examiner*—Eddie P. Chan
*Attorney, Agent, or Firm*—Finnegan, Henderson, Farabow, Garrett, and Dunner

[57] ABSTRACT

The present structure is an interchangeable interface circuit card which per se includes: circuitry which is responsive to being addressed in accordance with its physical location; circuitry to generate signals which identify the circuit being addressed and the peripheral to which it is connected; and circuitry to generate signals which effect a diagnostic routine applicable to at least some of the interchangeable interface circuits on the circuit card being addressed. In addition the present structure includes priority circuitry which operates in conjunction with a data handling system to assert a priority value assigned to the interchangeable interface circuit card and which, based on that priority, determines which one of a number of interchangeable interface circuit cards will be permitted to control a common data path.

16 Claims, 4 Drawing Sheets

(FIG. 2)

| $P_1$ | $P_0$ | PRIORITY LEVEL |
|---|---|---|
| 0 | 0 | 0 |
| 0 | 1 | 1 |
| 1 | 1 | 2 |

INTERCHANGEABLE INTERFACE CIRCUIT STRUCTURE

Matter enclosed in heavy brackets [ ] appears in the original patent but forms no part of this reissue specification; matter printed in italics indicates the additions made by reissue.

This is a continuation of application Ser. No. 06/351,721, filed Feb. 24, 1982, now abandoned.

BACKGROUND

In data handling systems and in particular in computer systems, the concept of enlarging the capability and/or capacity of a basic system into a medium-sized system or even a large-scale system, by adding modular units to the basic system, has long been pursued. However, heretofore a system which permitted such "modular" addition and removal required that the system provide a number of hardware (circuitry) features to accommodate the addition and removal of the modules (i.e., interface circuits and peripherals). For instance, with respect to a first feature of prior art systems, each interface circuit card has resident decoding circuitry as part thereof, so that when the master system wants to communicate with a modular device, the interface circuit can be addressed, irrespective of its physical location amongst the slot means which hold such interface circuit (cards). Such decoder circuitry has been fabricated, in the prior art, such that for each modular device, of a given type (e.g., a floppy disc device), a standard address circuitry configuration is provided, and if the standard address were to necessitate a change, jumpers or wirewrap changes are added or made to the address decoding circuitry to "change the address." Thirdly, while some prior art systems do permit a certain amount of interchangeability (because each interface circuit is addressable), such systems have normally required that the interface circuit cards be particularly placed in an ordered arrangement of slots to implement a method for determining priority amongst a group of active interface circuits.

The circuitry which effects a serial scanning of the "ordered" slots has, in the prior art, been some form of "daisy chain" configuration and such configurations require that there be no empty or vacant slots between active interface circuit cards. This constraint is suffered by prior art circuits. In addition, as the number of possible modular peripherals, which could be added, were in fact increased, the amount of memory space used for I/O devices, addresses, per se, increased. Further since the diagnostic routine instructions, in the prior art, use memory space in the main system, it follows that as the number of modular devices, which optionally could be added, were in fact increased, the amount of memory space used by diagnostic routine was increased. The increased use of memory space, described above, of course reduces the amount of memory space available for use with problem solving programs. In the prior art such memory restraints are overcome by adding memory capacity at additional costs.

The present invention: eliminates the necessity of having address decoding circuitry on each interface circuit card; eliminates the "ordering" of interface circuit cards in particular slots, to accommodate a priority determination plan; permits vacant slots to exist between active interface circuit cards; eliminates excessive use of memory space to accommodate addresses for increased numbers of optional peripheral devices; and eliminates excessive use of memory space to accommodate additional diagnostic instructions as the number of optional peripheral evices is increased. It is to the foregoing concerns that the present invention offers a solution.

SUMMARY OF THE INVENTION

The present invention is an interface circuit mounted on a circuit card, which interface circuit is provided with a means to enable it to be addressed irrespective of where it is located amongst the many possible locations into which interface circuit cards may be located on a chassis of a data handling system with which the present invention is used. Such flexible addressing procedure is made possible in part because the physical locations, per se, are addressable and therefore, a circuit card need not have address decoding circuitry to effect its own addressability and such card may be in any physical location. Secondly, the interface circuit is provided with means to generate signals which identify the circuit mounted on the card at the physical location being addressed. Accordingly, after the first interrogation of a given location, to find out which circuit resides in said given location, the identification information is used in part to generate a configuration table in memory of a main system. The configuration table enables an identification address for a particular circuit to fetch the previously mentioned location address. This self-configuration enables any interface circuit card to be located into any of the holder means locations or slots in the chassis without causing the user to reprogram the operation to take into account that the interface circuit cards have been interchanged. In addition, the present interface circuit by way of further self-containment, includes a memory device wherein there is stored a predesigned diagnostic routine, particularly applicable to the interface circuit mounted on the card. This feature reduces the amount of memory space, in the main system, which is used for diagnostic routines. Further, the present interface circuit includes a priority signal arrangement which is employed with a logic circuit network in the data processing system, with which it is used, as well as a "last look" network on the card per se. The priority signal network along with an arbiter circuit in the data handling system, with which the card is employed, as well as the "last look" network on the card per se, provide a means that, irrespective of interchangeability, permits the interface card to enable a peripheral device with which it is associated to obtain control of a common data flow path in accordance with an assigned priority of the peripheral.

The features and objects of the present invention will become apparent in view of the following discussion taken in conjunction with the drawings in which:

DESCRIPTION OF THE PREFERRED EMBODIMENTS

Figure 1:
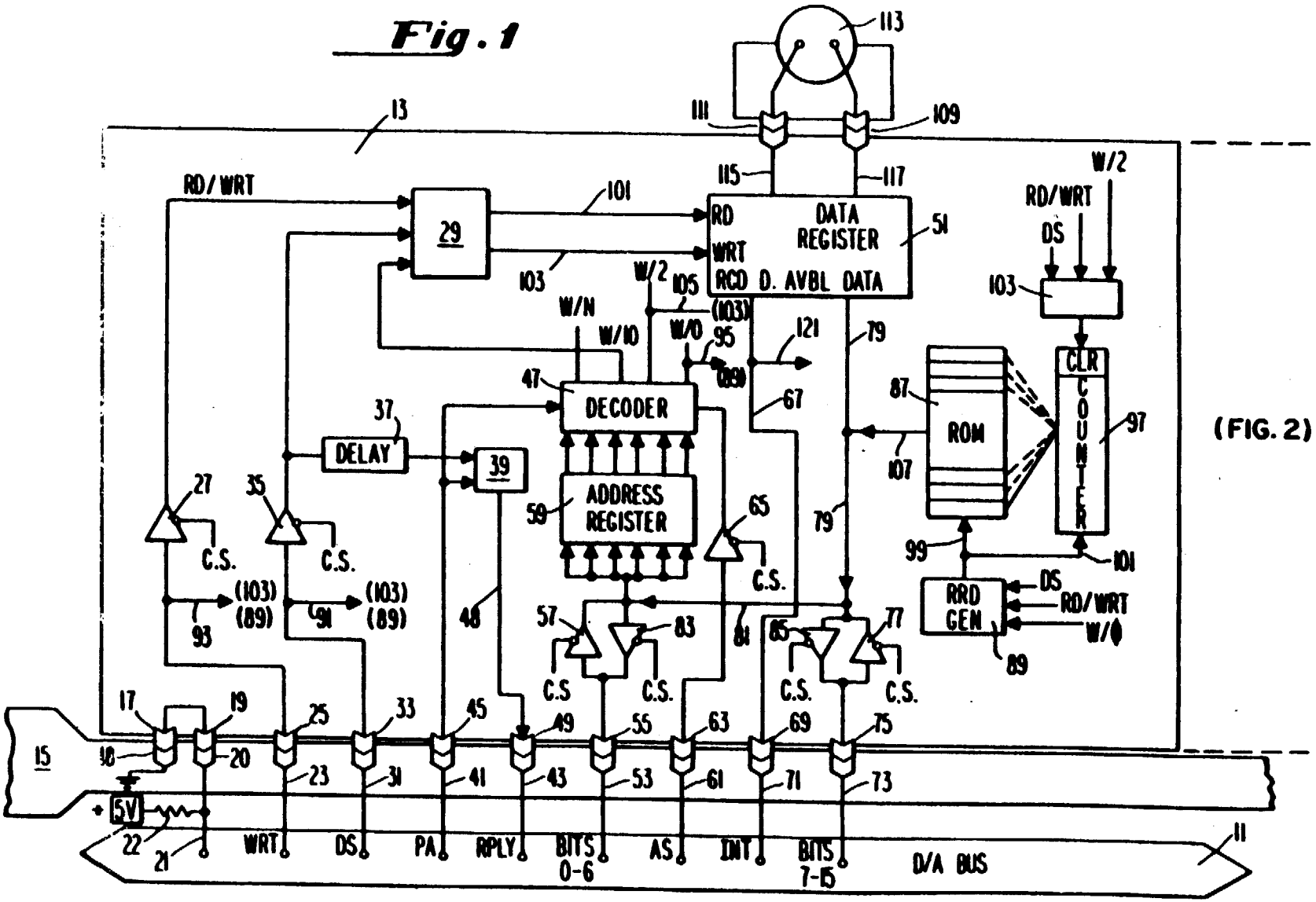
FIG. 1 is a schematic block diagram of the basic interface circuit without a priority arrangement.

Consider FIG. 1. In FIG. 1, there is shown a data address bus 11 hereinafter referred to as the D/A bus, which is a general bus that is connected to a data handling system, or a computer system, with which a present interface circuit may be employed to interface a peripheral. In the preferred embodiment there are some sixty wires or data paths located in the D/A bus 11 but obviously more or less can be used depending upon the number of circuit elements that have to be driven.

The data card 13, shown on FIG. 1, is mounted in a chassis of the data processing system with which it is used. In FIG. 1, the data card 13 is shown mounted onto a holding means 15 which can be the base of a slot-type arrangement along which the card slides. At some given home position, the card is clamped into the slot by a rotating mechanical cam device. Actually, when the card is clamped into the slot, the circuit terminals, on the card, mesh or engage with the counterpart circuit terminals on the holding means. Sometimes such meshing terminals have been referred to as Yaxley plugs or AMP connectors. As can be seen in FIG. 1, when the circuit card 13 is clamped into position, the connector terminals 17 and 19 respectively engage the connector terminals 18 and 20 so that a circuit is completed from +5 V, through resistor 22 to ground potential. Accordingly when the foregoing circuit is completed, there is a ground signal provided on line 21 which indicates that there is a "card present" in that location. The signal on line 21 is important to the data processing system, with which the circuit card is used, because the data processing system at some point would address the peripheral, with which the circuit card is associated, to either have information transmitted therefrom or transmit information thereto. If the data processing system "believed" through some programming arrangement that a card, (and therefore a peripheral), were communicatable through a given slot, but in fact, there were no interface circuit in said slot, the inquiry by the master system to that location might well result in an indication that the circuitry was not operating properly, or even worse, the failure to reply by the circuitry at the empty slot, could result in having the operation of the master system "hung up."

Because of the way in which the logic circuitry is arranged on the circuit card, certain of the lines connected to D/A bus 11 have specific assignments. Each of the cards used with a system in which the card 13 is employed must abide by the assignment rules so that there can be interchangeability of the cards. In the embodiment shown in FIG. 1, the line 23 is connected to a line in the D/A bus 11 through which there is transmitted a read/write signal. The read/write signal on line 23 is transmitted through the connector terminals 25, through the controllable buffer 27 to the logic circuitry 29. The controllable buffer 27 is controlled by a control signal from the control signal logic circuitry in the master system, which circuitry regulates the data flow into and out of the circuit card 13. The understanding of such two way data flow can be better understood from reference to a copending application entitled, "An Arrangement To Time Separate Bidirectional Current Flow," Ser. No. 06/351 720, and assigned to the assignee of this application. The controllable buffer 27 may be any one of a number of commercially available buffers manufactured by well-known integrated circuit manufacturers and in the preferred embodiment is an 8307 manufactured by Advanced Micro Devices Corporation. The logic circuitry 29 is a properly configured group of NAND gates and AND gates. The grouping of the NAND gates and the AND gates in the circuit 29 is for the purpose of providing a read signal on line 101 and a write signal on line 103. Actually, the way the master system operates, there is a signal on line 23 at all times indicative of a read signal unless, in fact, a write signal is generated.

In FIG. 1, it can be seen that the second line 31 is connected to the D/A bus 11 to receive a data strobe signal. The master system, with which the present interface circuit card is used, provides as part of its timing signals, first an address strobe signal during a first period of time, followed thereafter by a suitable "dead period," followed thereafter by a data strobe signal and followed thereafter by a suitable "dead period." The cycle is then repeated except if the clock signal generator is put in an "idle" condition. It is the purpose of the address strobe signal and the data strobe signal to condition the proper elements within the system, including the elements on the interface circuit card, so that during the address strobe time, the information that is being transferred, is considered address information while during the data strobe time, the information that is being transferred is considered informational data. By informational data is meant not only the kind of data that is used in accounting problems, such as values of monies and the like, but also instructional data. The data strobe signal is transmitted along line 31, through the connector terminals 33, through the controllable buffer 35 to the logic circuitry 29. In addition, the data strobe pulse is transmitted through the delay line 37 to the gate circuit 39. The significance of the data strobe pulse passing through the delay line 37, will be explained hereinafter.

The third line from the connector terminals is connected to the D/A bus 11 in order to receive a position address signal. The master system with which the interface circuitry card 13 is employed, is formed such that each slot, or each holding member location, has a particular address. That address information is stored in the memory of the system, and when it is fetched from that memory it goes through a decoder device, which generates a single signal. The single signal so generated is indicative of the particular slot which is being addressed. The signal on line 41 is labeled PA to indicate a position address signal. The significance of the position address signal will become apparent as the description of the identification signals is considered. The position address signal is transmitted along the line 41, through the connector terminals 45 to the gate 39 and as well as to the decoder 47. The PA signal enables the decoder 47 to provide an output signal therefrom as will be discussed hereinafter.

The fourth line 43 which is connected from the connector terminals to the D/A bus 11 is connected thereto to provide a reply signal to the master system with which the circuit card is employed. The reply signal is generated at the gate 39 in response to the simultaneous presence of a delayed data strobe pulse and a position address signal. The reply signal is transmitted along line 48, through the connector terminals 49, through the line 43 back to the D/A bus 11. The significance of the reply signal is explained immediately hereinafter. When the master system has addressed the circuit card 13, or is interrogating the interface circuitry on card 13 for data, there will be present a PA signal as described before and since data is being requested, a data strobe signal will be present. The delay device 37 is employed to give the system a little additional time in which to make the data that is going to be transferred available. The master system does not want to condition the master system circuitry to receive that data, if in fact, the data is not being transferred or is not available to be transferred. Therefore, the master system waits for the reply signal to be returned in order to continue with the program. By providing the slight delay through the delay device 37, any circuit element which needs additional time, (for instance, the data register 51 may need additional time to have the data ready for transfer), is permitted more time than would be allowed by a normal data strobe signal.

The fifth circuit which is connected from the connector terminals to the D/A bus 11 is the circuit to receive the zero through sixth bits of a set of address signals. The low order bits of a set of address signals provide certain information to the interface circuit card which information acts to address certain locations. The seven bits provide some 128 address combinations and therefore provide a circuit board with a possibility of responding to some 128 addresses. The seven bits are transmitted over the lines 53, through the connector terminals 55, through the buffer 57 to the address register 59. It should be noted at this point that while in the drawings the data flow paths are shown as single lines, in point of fact, there may be multiple lines in parallel, such as is the case with lines 53 in order to conduct a group of parallel bits or parallel signals. The seven bits enter the address register 59 and as will be seen, these bits enter the address register during the address strobe period. The seven bits are held in the address register 59 and made available to the decoder 47 so that when the decoder 47 is enabled by a position address signal, the decoder 47 will provide one of many possible output signals.

The sixth circuit path from the connector terminals is connected to the D/A bus 11 to receive the address strobe (AS) signal therealong. As explained earlier, the address strobe signal appears or is generated during a given period of time, while the data strobe signal is generated during another period of time and there is a dead period between each of these signals. The address strobe signal is transmitted along the line 61, through the connector terminals 63, to the controllable buffer 65, and therefrom to the address register to enable that register during address strobe time as previously mentioned.

The seventh circuit connected from the connector terminals is connected to the D/A bus 11 to transmit an interrupt (INT) signal therealong to the master system. An interrupt signal is generated by the peripheral device, or by the interface circuitry on behalf of the peripheral device, to indicate that the peripheral device and/or the interface circuitry is experiencing an event that should be brought to the master system's attention and with which the master system must deal. For instance, by way of illustration, the data register 51 is shown having a port labelled "received data available." That port transmits information therefrom when the information has been received from the peripheral. If the peripheral, operating on its own, delivers data to the data register 51 and the data register 51 recognizes that data is available to the master system, then an interrupt signal is sent to the master system requesting the master system to find out what the condition might be with the interface circuitry. It should be noted that sometimes, if the interface circuit is a circuit that can become a master, or can act to be in control of a data flow path by way of a priority scheme, then the signal on line 67 acts as an internal request signal. The interrupt signal is generated and transmitted along the line 67, through the connector terminal 69, and along the line 71 to the D/A bus 11.

The eight circuit connected from the connector terminals is connected to receive the seventh through the fifteenth bits of a set of address signals. It should be noted that the master system with which the circuit card 13 operates, operates with words of two bytes wherein each byte has eight bits. In other words, a word in the present system has 16 bits. It will be recalled that the zero bit to the sixth bit are transmitted into the card circuitry through lines 53 and the remaining bits, the 7th through 15th, are transmitted into the card circuitry through lines 73. The zero through the 15th bit pass through the line 73 and line 53, through the connector terminal 75 and connector terminal 55, through the controllable buffers 77 and 57 to the data register 51. In a reverse direction, the 16 bits are transmitted from the data register 51, along the line 79, and thereafter seven of those bits are transmitted along the line 81, through the controllable buffer 83, through the interconnecting terminals 55, along the lines 53 back to the D/A bus 11. The remaining nine bits are transmitted from the juncture point 84, through the controllable buffer 85, through the connector terminals 75, along the lines 73 to the D/A bus 11.

As also can be noted in FIG. 1, there is shown a ROM device 87. In the preferred embodiment the ROM 87 is a 4K bit ROM and is employed to accomplish a number of operations. Insofar as this description goes, we will concern ourselves with the role that the ROM 87 plays for two major operations. Stored in the ROM 87 are the identification signals which identify the circuit card 13 and in addition thereto, stored therein are the diagnostic routine signals which are to be used in effecting a diagnostic routine, or a testing, of the critical elements on the interface circuitry of card 13.

Connected to the ROM 87 is a ROM read signal generator 89 whose output signal will be referred to hereinafter as RRD. The RRD generator 89 responds to the presence of a data strobe (DS) signal, a read/write signal, and a W/O signal. The DS signal is transmitted on line 91 after having been transmitted through the connector terminal 33. As is shown in FIG. 1, the line 91 indicates that it is connected to the RRD generator 89. The read/write signal is transmitted on line 93 after having been transmitted through the connector terminals 25. As is shown in FIG. 1, the line 93 indicates that it is connected to the RRD generator 89. Finally, the W/O signal is transmitted on line 95 from the decoder 47. As can be seen in FIG. 1, the line 95 indicates that it is connected to the RRD generator 89. The word zero or W/O signal is a signal which is generated in response to the proper combination of zero bit through sixth bit of the address information as described earlier. The proper combination of those seven bits transmitted through the address register 59 to the decoder 47 generates a single signal, i.e., a W/O signal, when the system intends that the ROM 87 should be read therefrom and that the counter 97 should be incremented. The RRD signal on line 99 serves to cause the ROM 87 to read or to transmit signals therefrom, while the RRD signal on line 101 causes the counter 97 to be incremented. Each time that an RRD signal is generated, the counter 97 is incremented and causes the next serial location in the ROM 87 to be read from. It should be noted that the counter 97 can be cleared or reset to a home position in response to an output signal from the gating circuitry 103. The clear circuitry 103 is responsive to a data strobe signal, a read/write signal, and a W/2 signal. The data strobe signal and the read/write signal are respectively transmitted along lines 91 and 93 as described in connection with the RRD signal generator 89. The W/2 signal is generated by the decoder 47 and as is shown in FIG. 1, the W/2 signal is transmitted on line 105 which in FIG. 1 shows that it is connected to the clear signal generator 103.

When the diagnostic routine is to be accomplished for the interface circuitry of the circuit card 13, the proper data storage locations of the ROM 87 are read under the control of counter 97. The test information and instructions are transmitted along the line 107, downward along the line 79, and through the controllable buffers 83 and 85 to the D/A bus 11.

It should be noted that the data register 51 is connected through the connecting terminals 109 and 111 to the peripheral connector 113. In a preferred embodiment, the information from the associated peripheral will pass through the connector 113 and serially into the data register along the line 115, while in another operation, the information signals will be conducted serially from the data register 51 along the line 117 through the connector terminals 109.

Because of a number of features in the present interface circuitry and its arrangement with the card, the present interface circuitry card is interchangeable into any position or slot of the chassis of the master system. As explained earlier, the closing of the connector terminals 17 and 19 with connector terminals 18 and 20 by the physical presence of the card 13, enables the master system to know that, in fact, there is an option card present in that location. By having a single connector terminal, which when activated provides a signal to address a particular slot, such as the signal on line 41, the interface circuit in that slot is able to respond, irrespective of what that interface circuit may represent. By having the circuitry self-contained in the sense that it can identify itself by providing identification signals from ROM 87, the interface circuit, in response to the position address signal on 41, is able to indicate to the master system what kind of an interface circuit is located in the slot being addressed. By virtue of using the identification signals in part, the address information in the master system memory can be reconfigured so that a software program which has been predesigned to call for a peripheral associated with the circuit card 13 in accordance with certain address information, can continue to use that same address information. That address information will always operate to fetch from the master system memory the location address whereat the card 13 is located. Finally, with respect to the basic card, the fact that ROM 87 which is present on the card has a self-contained diagnostic routine, enables the system, with which the interface circuit is used, to minimize the use of memory space for use with diagnostic routines.

Figure 2:
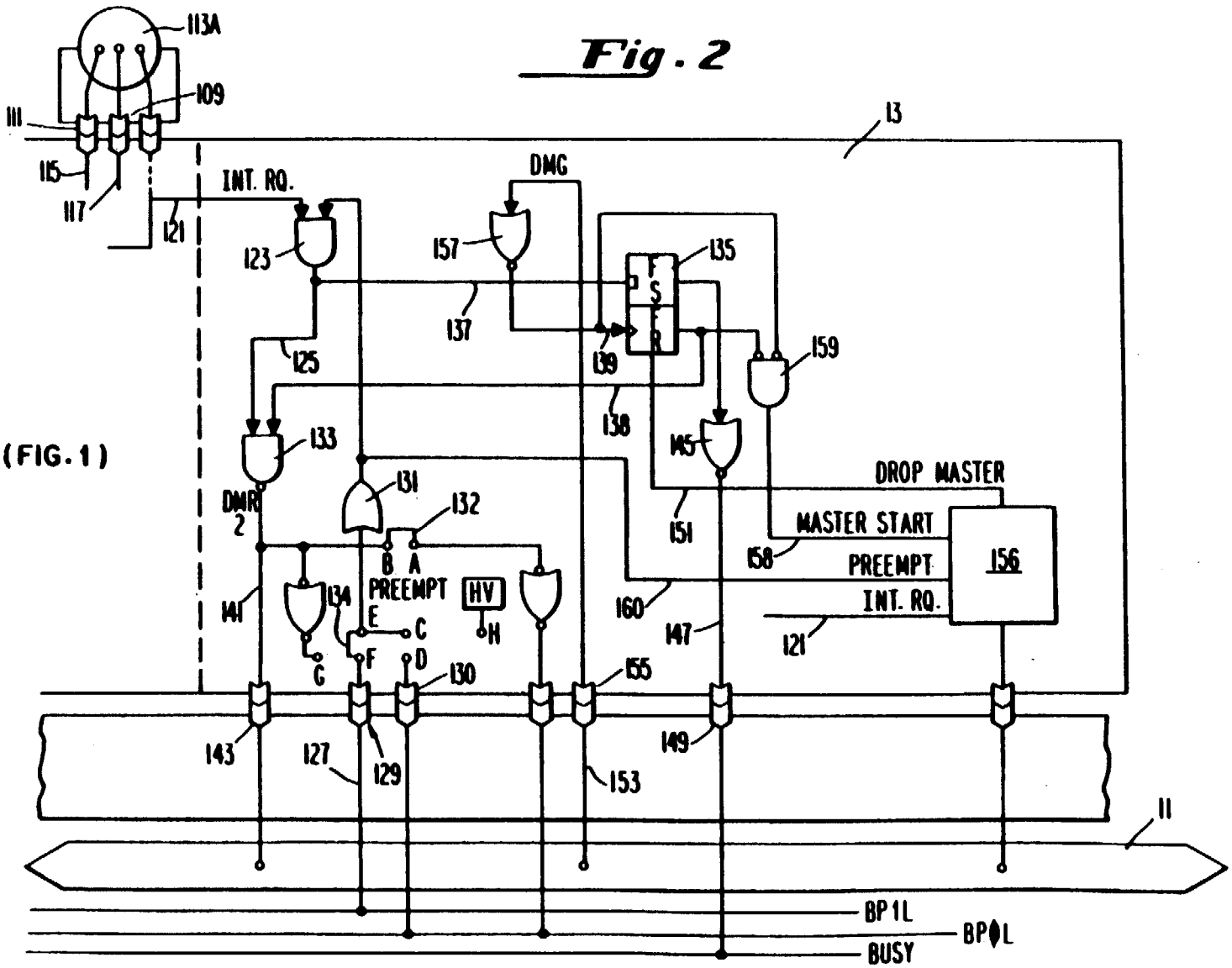
FIG. 2 is a block diagram depicting the circuitry required for determining priority among circuits of different priorities.

Consider FIG. 2. FIG. 2 depicts a circuit which would be added to the basic circuit of FIG. 1 in order to effect a level one priority condition, by having the circuit of FIG. 2 designed to be preempted by one priority condition, but on the other hand, having the circuit designed to preempt another priority condition. The request signal demonstrated in FIG. 2 is that of "direct memory access" with the shortened notation DM. "DMR" means direct memory access request, while "DMG" means direct memory access granted. It should be borne in mind that other forms of control could be requested within the spirit of the inventive concept taught here. A brief look at the table shown by FIG. 3A will assist in an understanding of FIG. 2. Note in FIG. 3 that a circuit which is assigned a priority of $P_0=0$ and $P_1=0$ is considered as having a level 0 or level zero priority. Level zero is the lowest priority in the arrangement being taught. Note further that a level "one" circuit, (which is the next higher level above level zero), has priority values of $P_1=0$ and $P_0=1$ while a level "two" circuit (which is the highest priority circuit in the arrangement being taught), has priority values of $P_1=1$ and $P_0=1$. Consider FIG. 2 again.

In FIG. 2, there is shown a circuit having a level one priority. The circuit is connected (along with the circuit shown in FIG. 1 and previously discussed) to the peripheral device through the connection 113A. When the peripheral device, or data responsive device, is in a state of data handling such that its circuitry needs to gain control of a common data flow path, the peripheral, or its interface circuit, generates an "internal request" signal on line 121. In the present example, this is a request by the peripheral, or interface circuit, to effect a direct memory access, i.e., to transfer data directly to memory in the data processing system. The internal request signal, which is a high signal, is transmitted to the AND gate 123. The other input signal to AND gate 123 comes from the BP1L line. The BP1L line is shown disposed outside of the D/A bus 11 for the purposes of discussion but in the preferred embodiment, it is located in the D/A bus 11 as are the lines "BPØL" and "BUSY."

As will become clearer as this portion of the circuit is discussed, if another interface card were subjected to an internal request, and it had a level two priority, then the BP1L line would be experiencing a low signal and AND gate 123 would not be fully conditioned to provide a high output signal on line 125. For the moment, let us consider that there are no higher priority circuits providing signals to the BP1L line and hence, the line is providing a high signal along line 127, through the connector terminals 129, through the OR gate 131 to the AND gate 123. Accordingly, if there were no higher priority circuits requesting control of the direct memory access, then AND gate 123 of circuit card 13, would provide a high signal to the NAND gate 133. The NAND gate 133 operates such that if there are two high input signals then there will be a low output signal and if either of the input signals is low then there will be a high output signal. The other input signal to the NAND gate 133 comes from the output terminal of the reset side of the flip-flop 135, which is high when flip flop 135 is reset. Hence a DMR signal is produced as the output from gate 133. The flip-flop 135 is a D-type flip-flop which can be transferred to its set side by a high signal on line 137 only when simultaneously there is present a clock signal, low to high transition, on line 139. In the circuitry of FIG. 2, the clock signal is an inverted DMG signal from the NOR gate 157. In the situation under discussion, a high signal has been produced on line 137 which attempts to transfer the flip-flop 135 to its set side, but since the DMG has not yet been generated, flip-flop 135 is not so transferred. Since there is one high signal to the gate 159 that gate is not conditioned to produce a master start signal. Since flip-flop 135 is in its reset state, there is a high signal on line 138 to fully condition NAND gate 133 to produce a low DMR2 signal on line 141. The signal labelled DMR2 means a request for direct memory access and from the particular card in the second slot. The DMR2 signal is transmitted through the connector terminals 143, to the D/A bus 11. At the same time, the low signal from the set side of flip-flop 135 is transmitted to the NOR gate 145 to provide a high impedance signal on line 147, through the connector terminals 149, to the BUSY line which indicates to the system that the circuit is not busy. The signal on line 151 is the reset signal to reset flip-flop 135 and this signal is generated when the mastership is given up. The interface circuit is awaiting a DMG pulse on line 153, which is transmitted through the connector terminals 155 to the NOR gate 157. The DMG signal (which is a grant signal from the master system) is a low pulse signal which provides a high pulse signal on line 139, and since there is still a high signal on line 137, flip-flop 135 is transferred to its set side. When the DMG pulse terminates, there is a low signal to gate 159 and the gate 159 becomes fully conditioned to provide a master start signal.

In FIG. 2, there is shown a card control logic circuit 156, which is provided with a master start signal from line 158, a preempt signal from line 160, and an internal request signal from line 121. If the master start signal is generated and the internal request signal continues, the card control logic 156 provides the control signals such as DS, AS, RD/WRT and the like, which are required to effect the transfer of data to and from, between the peripheral and the system memory. When the transfer has been completed, the internal request signal will be terminated and hence, the drop master signal is generated. The drop master signal terminates the control signals from the control circuit 156 and is transmitted to line 151 to reset the flip-flop 135 which in turn, terminates the master start signal from gate 159. It should be noted that the card control logic 156 monitors the preempt signal even after the circuitry has taken control of the bus (i.e., has become the master). If a higher priority interface card exercises its priority, the preempt signal on line 160 will condition the card control logic circuit 156 to cause it to generate a drop master signal at the end of the then current bus cycle and accordingly, reset the flip-flop 135. As described above, the drop master signal causes the circuit to give up control of the bus.

Accordingly, we have seen how the circuitry of FIG. 2 will produce a DMR signal if there are no higher priority circuits seeking control. Consider now a situation where a higher priority circuit is seeking control.

If a higher priority circuit (in this case a level "two" priority circuit) had already been subjected to an internal request prior to card 13 being subjected to its internal request, then the BP1L line would be low and the low signal would be transmitted through the connector terminals 129 through the OR gate 131 to render the AND gate 123 non-responsive to the internal request signal on line 121. In short, the low signal on the BP1L line would preempt the circuit on card 13 from generating a DMR signal on line 141. The circuitry of FIG. 2 provides a "last look" feature. If the circuit on card 13 had already generated a DMR signal but the DMG signal had not yet been received from the data processing system and if during this time a higher priority circuit asserts or drives the BP1L line, then the "last look" feature becomes meaningful. It is apparent that the BP1L input signal to the AND gate 123 would become low and hence, the signal on line 137 would go low. Since the flip-flop 135 needs the presence of a high signal on line 137 when the DMG signal is generated, if becomes apparent that there will be no master start signal and no seizing control of the bus. Hence, it is apparent that even if a circuit has completed its request and is about to receive a grant, the "last look" provides that if a higher priority circuit asserts its priority line, the request will be terminated and a subsequent grant will be ignored.

Figures 3, 3A:
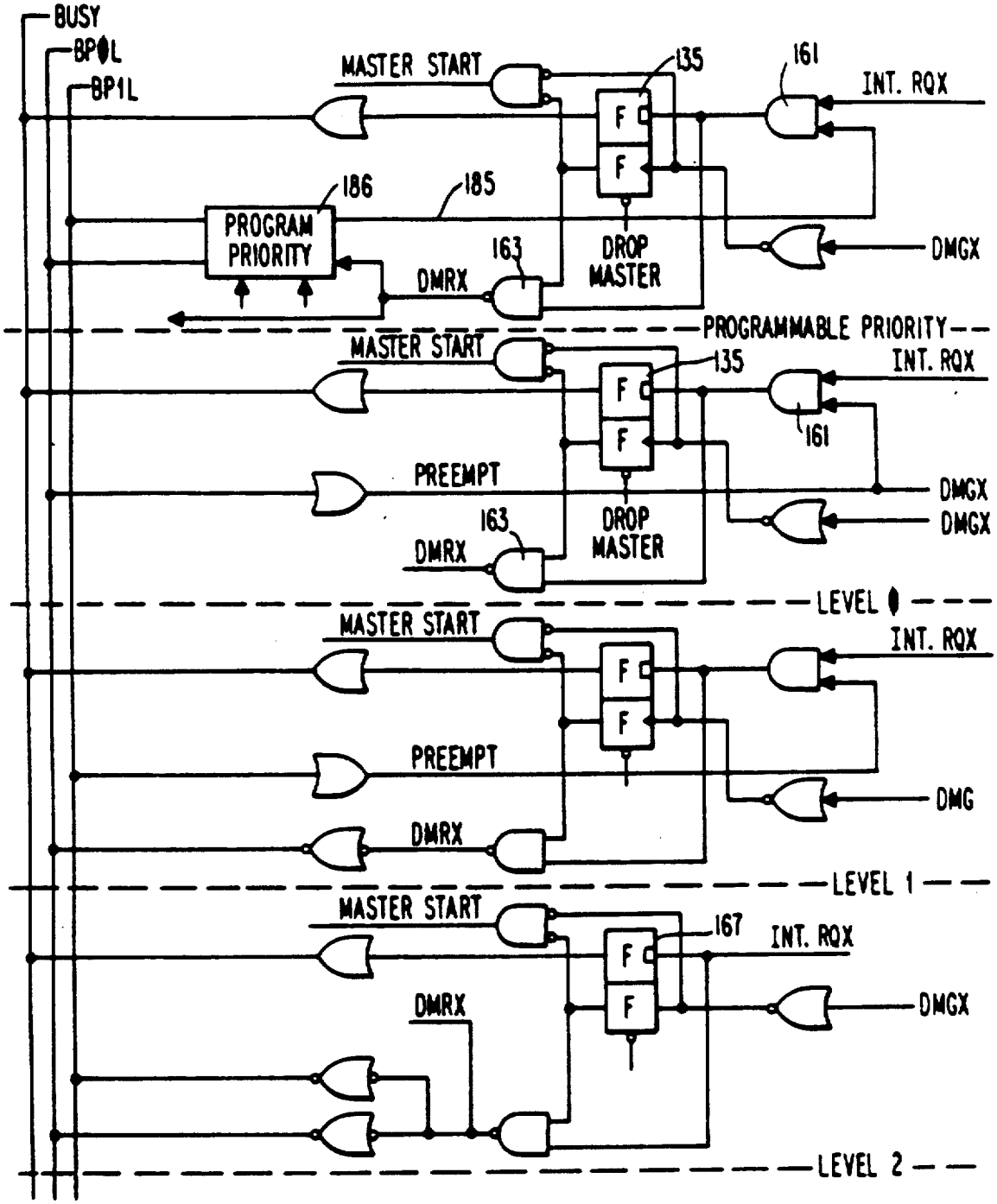
FIG. 3 is a schematic diagram of the networks employed to effect a programmable priority or any of a three-level priority recognition.
FIG. 3A is a table showing various priority levels for interface circuit card.
Figure 4:
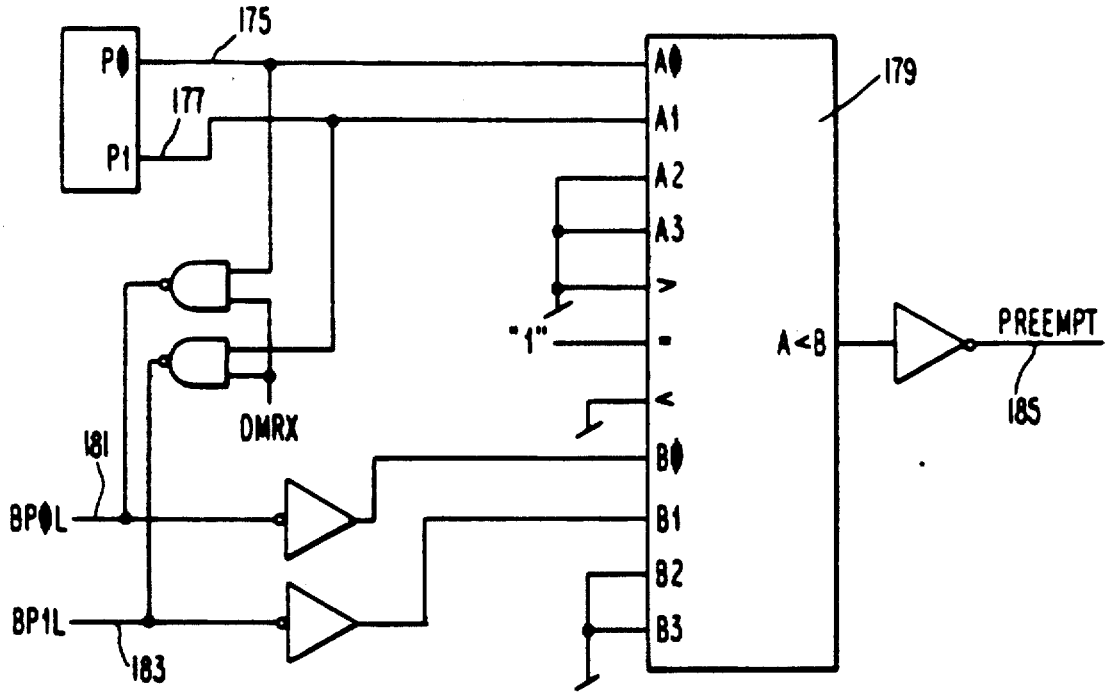
FIG. 4 is a block diagram depicting how priority level are screened.

Before we examine FIG. 3, examine FIG. 4. In FIGS. 3a and 4 there are shown two lines 175 and 177. Two signals from a register, in accordance with a program, are transmitted on lines 175 and 177 to the comparator device 179. The comparator device 179 can be any number of commercially available circuits and in a preferred embodiment is a 74S85 manufactured by Texas Instruments Company. As can be gleaned from FIG. 4, the lines 181 and 183 are connected to the BPØL and BP1L lines of FIG. 3. Hence, the lines 181 and 183 carry the voltage level signals provided by all circuits participating in the priority arrangement. In the comparator 179 the programmed priority signals for the circuit card on lines 175 and 177, (designated AØ and A1 in the comparator 179) are compared against the signals present on the BPØL and BP1L lines (designated as BØ and B1 in the comparator 179). If A is less than B, then there is provided a low preempt signal on line 185. If A is greater than or the same as B, then no low preempt signal is generated.

If we now examine FIGS. 3 and 3a, we find that in the programmable priority circuit, if there is a low signal on line 185, the circuit is preempted by not permitting the AND gate 161 to be fully conditioned. If the AND gate 161 is not fully conditioned, then the NAND gate 163 will not provide a DMR signal. It should be noted in FIG. 3 that the logic circuit 186 is meant to include the circuitry of FIG. 4. We find further in FIG. 3 the three level circuits. In the level zero circuit, it can be seen that a low signal on the BPØL line will preempt the circuit by not permitting the AND gate 161 to be fully conditioned. If the AND gate 161 is not fully conditioned, then the NAND gate 163 will not provide a DMR signal. The circuitry arrangement for the flip-flop 135 is the same as that described with FIG. 2. The level one circuitry is the same as that described with FIG. 2. The level two circuitry differs somewhat in that there is no preemption circuit. Note that the internal request signal is transmitted directly to the flip-flop 167. Since the level two circuit is the highest priority circuit there is no higher priority to preempt it. Note also, in the level two circuit, that both the BPØL and BP1L lines are driven low to render any lower priority circuit in a preempted state. Now, if there are two circuits of the same priority requesting control of the common data flow path, then the main system circuitry provides a means to decide therebetween.

In FIG. 2 note that there are shown a set of terminals A through H connected or in close proximity to the connector terminals 129 and 130. If the circuit card is to operate with a level one priority, then the jumpers 132 and 134 are placed as shown to provide a preempt signal from the BP1L line and to provide a low signal to the BPØL line. If the circuit card 13 were to operate with a level zero priority, then the jumper 134 would be located in the C-D terminals to provide a preempt signal from the BPØL line and the jumper 132 would be removed since the level zero circuits do not drive any lines for preemption. If the circuit card 13 were to operate with a level two priority, then the jumper 134 would be located in terminals G-F and jumper 132 would remain in terminal A-B which would enable the circuit to drive both the BPØL line and the BP1L line. In addition, there would need to be a jumper between terminals C-H to provide a high level signal from HV (High Voltage) to the AND gate 123.

The jumper transitions are a simple arrangement which are shown for illustrative purposes only to effect changing the priority arrangement. The circuitry of FIG. 4 is an electronic solution to the problem.

The present system operates: (1) to permit selection from a large number of possible options without unduly using memory space for I/O addresses; (2) to run diagnostic routines for each interface circuit without having to use excessive memory space in the memory of the main system; (3) to address interface circuit cards, irrespective of how they are interchanged in their holding means, without providing address decoding circuitry on each interface circuit card; (4) to effect a priority determination amongst requesting interface circuits having different priorities; (5) to effect a "last look" and continual monitoring after a demand for control of a common data flow path has been made, or has been granted, so that if a high priority request is made the system will act to accommodate that request; and (6) to permit interchanging the interface cards without requiring that there be no vacant slots between active interface circuit cards.

We claim:

1. An interchangeable interface circuit card means for providing electrical signal paths between data signal response means and data signal handling means, said data signal handling means having matching connectable terminals and providing a plurality of different first control signals including at least one physical location signal which indicates the physical position of said interchangeable interface circuit card means, said interchangeable interface circuit card means comprising in combination:

circuit card means having at least one edge and having connectable terminals disposed along said at least one edge for connecting to said matching connectable terminals of said data signal handling means, whereby when said connectable terminals are connected to said matching connectable terminals there is a plurality of first electrical signal paths formed through said connectable terminals and said matching connectable terminals;

first circuitry means including decoding circuitry means which operate under control of certain of said first control signals including said physical location signal, said first circuitry means connected through some of said first electrical signal paths to said data signal handling means for receiving and decoding certain of said first control signals to provide second control signals;

second circuitry means which operates under control of certain of said second control signals, said second circuitry means mounted on said circuit card means and connected to said first circuitry means to receive said certain of said second control signals for generating identifying signals, which identify particular data signal responsive means when connected to said circuit card means;

third circuitry means which operate under control of particular ones of said first control signals, said third circuitry means connected to said second circuitry means and to some of said first electrical signal paths to receive said particular ones of said first control signals for transmitting said identifying signals from said second circuitry means to said data signal handling means;

fourth circuitry means mounted on said circuit card means for connection to said data signal responsive means; and fifth circuitry means which operate under control of some of said first control signals, said fifth circuitry means connected to certain ones of said first electrical signal paths to receive said some of said first control signals and connected to said third circuitry means and to said fourth circuitry means to complete said electrical signal paths through logic circuit means between said data signal responsive means and said data signal handling means in response to certain of said first control signals.

2. An interchangeable interface circuit card means for providing electrical signal paths between data signal responsive means and data signal handling means, which last mentioned means has matching connectable terminals and provides both first control signals and physical location signals, said physical location signals being respectively indicative of the physical position of said interchangeable interface circuit card means and being identifiable with said interchangeable interface current card in response to said data signal handling means initially receiving identifying signals from said interchangeable interface card means, said interchangeable interface circuit card means comprising in combination:

circuit card means having at least one edge and having connectable terminals disposed along said at least one edge for connecting to said matching connectable terminals whereby when said connectable terminals are connected to said matching connectable terminals there is a plurality of first electrical signal paths formed through said connectable terminals and matching connectable terminals;

first circuitry means which operate under control of certain second control signals, said first circuitry means mounted on said circuit card means for generating said identifying signals in response to said certain second control signals;

second circuitry means including decoding circuitry means which operate under control of at least one of said physical location signals, said second circuitry means connected to said first circuitry means for generating said second control signals in response to receiving and decoding some of said first control signals and initially receiving said at least one of said physical location signals, said second circuitry means connected to at least one of said first electrical signal paths to receive said at least one of said physical location signals;

third circuitry means which operate under control of particular ones of said first control signals, said third circuitry means connected to said first circuitry means and to some of said first electrical signal paths to receive said particular ones of said first control signals for transmitting said identifying signals from said first circuitry means to said data signal handling means, thereby enabling said last mentioned physical location signal to be generated in response to said data signal handling means receiving said identifying signals from sources other than interchangeable interface card means;

fourth circuitry means mounted on said circuit card means for connection to said data signal responsive means; and fifth circuitry means which operate under control of some of said first control signals, said fifth circuitry means connected to certain ones of said first electrical signal paths to receive said some of said first control signals and connected to said third circuitry means and to said fourth circuitry means to complete said electrical signal paths through logic circuit means between said data signal responsive means and said data signal handling means in response to said some of said first control signals received from said data signal handling means.

3. An interchangeable interface circuit card means according to claim 2 wherein said first circuitry means further generates diagnostic routine instruction signals which effect diagnostic tests on selected portions of the circuitry mounted on said circuit card means.

4. An interchangeable interface circuit card means according to claim 2 wherein said second circuitry means includes a register means connected to said third circuitry means and wherein said decoding circuitry means connected to said at least one of said first electrical signal paths whereby signals transmitted from said data signal handling means through said third circuitry means are temporarily held and then decoded to provide at least some of said second control signals to said first circuitry means.

5. An interchangeable interface circuit card means according to claim 2 wherein two of said matching connectable terminals are part of a circuit card present circuit and further wherein two of said connectable terminals are disposed to engage said two of said connectable terminals and cause a circuit card present signal to be generated indicating to said data signal handling means that an interchangeable interface circuit card means is engaged with said data signal handling means.

6. An interchangeable interface circuit card means according to claim 2 wherein said data signal handling means includes a data flow path and wherein there is further included sixth circuitry means having means for generating a request signal for control of said data flow path and wherein there is further included priority determination circuitry for connecting to similar priority determination circuitry on similar other interchangeable interface circuit card means whereby in the event more than one of said interchangeable interface circuit card means generates a request signal for control of said data flow path, such priority determination circuitry will operate with other similar priority determination circuitries to determine which among said interchangeable interface circuit card means connected to said data flow path will have control of said flow path.

*7. An interchangeable interface circuit card for providing electrical circuit paths between a peripheral subsystem and a data bus in a data processing system, said data bus being coupled to a central processing unit and other interface circuit cards, and said circuit paths carrying identifying signals for identifying said interface circuit card and first control signals for requesting said identifying signals, said interchangeable interface circuit card comprising:*

*a circuit card substrate having an edge with connectable terminals disposed along said edge for electrical connection along said data bus to connectable terminals on said other interface circuit cards;*

*signal generation means, resident on said circuit card substrate and responsive to the receipt of said first control signals, for generating second control signals from said first control signals;*

*identification means, responsive to said second control signals and resident on said circuit card substrate, for generating said identifying signals in response to said second control signals;*

*identifier driver means, responsive to said first control signals and resident on said circuit card substrate, for transmitting said identifying signals to said central processing unit via said data bus;*

*request means, resident on said circuit card substrate, for generating a request signal for transmission to the other interface cards to obtain control of said data bus;*

*priority generation means, responsive to said request signal and resident on said circuit card substrate, for placing an encoded first priority arbitration signal, in parallel, onto an arbitration portion of said data bus onto which said other interface circuit cards also place other encoded priority arbitration signals in parallel, said encoded first priority arbitration signal representing a priority relative to request signals from said other interface circuit cards;*

*priority examination means, resident on said circuit card substrate, coupled to said data bus, and responsive to the placement of said other encoded priority arbitration signals on said data bus for decoding said encoded first priority arbitration signal and said other encoded priority arbitration signals on said data bus and for detecting the presence on said arbitration portion of said data bus of said other priority arbitration signals from said first other interface circuit cards representing a higher priority than said first priority arbitration signals; and*

*modifying means, resident on said circuit card substrate and coupled to said priority examination means, for modifying said priority generation means' placement of said encoded first priority arbitration signal onto said arbitration portion of said data bus when said priority examination means indicates the presence on said arbitration portion of said data bus of any of said other encoded priority arbitration signals representing a higher priority than said first priority arbitration signal.*

*8. The interface circuit card of claim 7 wherein said modifying means includes means for causing said priority generation means to inhibit placement of at least a portion of said first priority arbitration signal onto said arbitration portion of said data bus when said priority examination means indicates the presence on said arbitration portion of said data bus of any of said other priority arbitration signals representing a higher priority than said first priority arbitration signal.*

*9. The interface circuit of claim 8 further including request driver means, coupled to said request means, for placing said request signal onto said data bus.*

*10. The interface circuit card of claim 9 further including request disabling means for inhibiting the placement of said request signal on said data bus when said priority examination means indicates the presence of any of said*

*other priority arbitration signals on said arbitration portion of said data bus representing a higher priority than said first priority arbitration signal.*

*11. The interface circuit card of claim 7 further including* bus master means, responsive to said priority examination means, for obtaining control of said data bus in response to the generation of said request signal if said priority examination means does not detect the presence of any of said other priority arbitration signals representing a higher priority than said first priority arbitration signal; and

*means, coupled to said bus master means and responsive to said disabling means, for relinquishing control of said data bus when said priority examination means subsequently detects the presence of any of said other priority arbitration signals representing a higher priority than said first priority arbitration signal.*

*12. The interface circuit card of claim 7 wherein said priority generation means includes a circuit for generating said first priority arbitration signal at a fixed priority.*

*13. The interface circuit card of claim 7 wherein said priority generation means includes a circuit for generating said first priority arbitration signal such that it is dynamically capable of representing a plurality of priorities.*

*14. The interface circuit card of claim 13 wherein said modifying means includes means for comparing the priorities represented by said other priority arbitration signals with any of said plurality of priorities capable of being represented by said first priority arbitration signal.*

*15. The interface circuit card of claim 7 wherein said priority generation means includes open collector transistors.*

*16. The interface circuit card of claim 7 wherein said priority examination means includes decoder circuitry.*

* * * * *